US008363589B2

(12) United States Patent
Haaparanta

(10) Patent No.: US 8,363,589 B2
(45) Date of Patent: Jan. 29, 2013

(54) METHOD AND APPARATUS FOR GENERATING AND UTILIZING COMMUNICATIONS SHORTCUTS

(75) Inventor: Juhani Haaparanta, Tampere (FI)

(73) Assignee: Nokia Corporation, Espoo (FI)

( * ) Notice: Subject to any disclaimer, the term of this patent is extended or adjusted under 35 U.S.C. 154(b) by 335 days.

(21) Appl. No.: 12/648,970

(22) Filed: Dec. 29, 2009

(65) Prior Publication Data

US 2011/0158125 A1 Jun. 30, 2011

(51) Int. Cl.
*H04W 4/00* (2009.01)
(52) U.S. Cl. .................. 370/313; 455/564; 455/566
(58) Field of Classification Search .......... 370/254, 370/313
See application file for complete search history.

(56) References Cited

U.S. PATENT DOCUMENTS

| 2002/0128047 | A1* | 9/2002 | Gates .................. 455/566 |
| 2006/0135142 | A1 | 6/2006 | Repka |
| 2006/0229097 | A1 | 10/2006 | Flynt et al. |
| 2007/0035513 | A1 | 2/2007 | Sherrard et al. |
| 2008/0004080 | A1* | 1/2008 | Li et al. .................. 455/564 |
| 2009/0177795 | A1* | 7/2009 | Leduc .................. 709/238 |
| 2009/0307606 | A1* | 12/2009 | Wyman et al. .................. 715/752 |
| 2010/0058193 | A1* | 3/2010 | Sherrard et al. .................. 715/738 |
| 2010/0169510 | A1* | 7/2010 | Ho et al. .................. 710/10 |
| 2011/0028118 | A1* | 2/2011 | Thomas .................. 455/404.1 |

OTHER PUBLICATIONS

International Search Report and Written Opinion for Application No. PCT/IB2010/055301 dated Apr. 5, 2011.

* cited by examiner

*Primary Examiner* — Jung Park
(74) *Attorney, Agent, or Firm* — Alston & Bird LLP

(57) ABSTRACT

Various methods for generating and utilizing communications shortcuts are provided. One example method includes associating a contact information detail to an unassigned shortcut for implementing one of at least one communications method associated with the contact information detail, and configuring the unassigned shortcut to initiate a communication session with a party associated with the contact information detail in response to a selection of the unassigned shortcut. Similar and related example methods and example apparatuses are also provided.

9 Claims, 8 Drawing Sheets

METHOD AND APPARATUS FOR GENERATING AND UTILIZING COMMUNICATIONS SHORTCUTS

TECHNICAL FIELD

Embodiments of the present invention relate generally to the functionality of communication devices, and, more particularly, relate to a method and apparatus for generating and utilizing communications shortcuts.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of communications.

Current and future networking technologies facilitate the utilization of various mechanisms for supporting the communications needs of users. Users can now readily use audio, video, and text based communications solutions to interact with their friends, family, business partners, and the like. Many of these communications solutions require an identifier or contact information detail, such as a phone number, address, screen name, or the like to facilitate contacting a particular party.

BRIEF SUMMARY

Example methods and example apparatuses are described that provide for generating and utilizing communications shortcuts. According to the various example embodiments, communication shortcuts may be generated to facilitate convenient initiation of communications sessions based on contact information details, such as phone numbers, email addresses, screen names, and the like. In this regard, according to some example embodiments, a single tap on the shortcut initiates a communications session using an associated contact information detail. According to some example embodiments, the shortcuts may be implemented in a contact card application. Further, according to example embodiments, the shortcuts may be defined as either assigned shortcuts or unassigned shortcuts. An assigned shortcut may be bound to a particular communications detail, possibly as defined by a user. An unassigned shortcut may be automatically generated upon entry of the contact information detail in a contact record, such as a contact card, based on an associated communications method. If more than one contact information detail associated with the same communications method is unassigned, an unassigned shortcut for that communications method may be generated that, when selected, provides options for selecting one of the contact information details to initiate a communications session.

Various example methods and apparatuses of the present invention are described herein, including example methods for generating and utilizing communications shortcuts. One example method includes associating a contact information detail to an unassigned shortcut for implementing one of at least one communications method associated with the contact information detail, and configuring the unassigned shortcut to initiate a communication session with a party associated with the contact information detail in response to a selection of the unassigned shortcut.

An additional example embodiment is an apparatus configured to generate and utilize communications shortcuts. The example apparatus comprises at least one processor and at least one memory including computer program code, the at least one memory and the computer program code configured to, with the at least one processor, cause the apparatus to perform various functionality. The example apparatus may be caused to perform associating a contact information detail to an unassigned shortcut for implementing one of at least one communications method associated with the contact information detail, and configuring the unassigned shortcut to initiate a communication session with a party associated with the contact information detail in response to a selection of the unassigned shortcut.

Another example embodiment is a computer-readable storage medium having computer program code stored thereon, wherein execution of the computer program code causes an apparatus to perform various functionalities. Execution of the computer program code may cause an apparatus to perform associating a contact information detail to an unassigned shortcut for implementing one of at least one communications method associated with the contact information detail, and configuring the unassigned shortcut to initiate a communication session with a party associated with the contact information detail in response to a selection of the unassigned shortcut.

Another example apparatus includes means for associating a contact information detail to an unassigned shortcut for implementing one of at least one communications method associated with the contact information detail, and means for configuring the unassigned shortcut to initiate a communication session with a party associated with the contact information detail in response to a selection of the unassigned shortcut.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
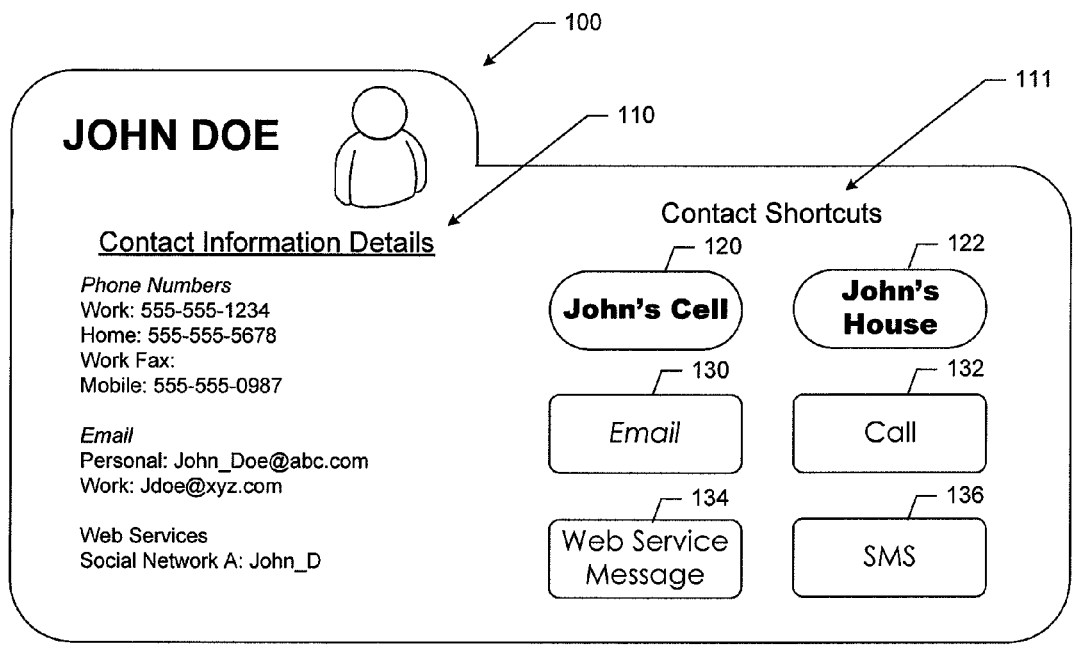
FIG. 1 illustrates a user interface including a contact card according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to various example embodiments of the present invention, methods and apparatus for generating and utilizing communications shortcuts are provided. A communication shortcut (or simply referred to as a shortcut) may be a control of a user interface that, when selected, initiates a communications session based on the attributes of the shortcut. Initiating a communications session may include placing a phone call, opening a text message entry field, opening an email entry field, opening a web service message entry field, or the like. Initiation of the communications session may performed in a manner that loads a contact information detail to facilitate communications with the intended party.

A shortcut may have one or more attributes in the form of contact information details and a communication method. A contact information detail may be information that is utilized to direct a communications session to a particular party. For example, a contact information detail may be a phone number, an email address, a screen name, and the like. According to various example embodiments, contact information details for a given contact may be stored within a contact record for a given contact, such as a contact card.

A communications method may be a vehicle used for communicating with other parties. For example, communications methods may include telephone voice calls, video calls, text messaging, multimedia messaging, email messaging, web service messaging, and the like. According to various example embodiments, a type of contact information detail may be associated with particular types of communications sessions. For example, a contact information detail that is an email address may be associated with an email communications session. Further, a contact information detail that is a phone number may be associated with a phone call communications session, a simple message service (SMS) communications session, and/or a multimedia message service (MMS) communications session, since each of these types of communications sessions may be implemented using a phone number.

The attributes of the shortcut may define the functionality that is preformed by the device displaying the shortcut. For example, a shortcut having attributes including a contact information detail that is a phone number and a communication method that is SMS, may open a text message entry field for entering a text message to be sent to the phone number of an associated party. According to various example embodiments, a device displaying a shortcut may utilize a touch screen display, and selecting the shortcut to initiate a communications session may involve a single tap on the touch screen display at an area defined by the shortcut.

According to various example embodiments, a shortcut may be assigned or unassigned. An assigned shortcut may be, for example, a user defined shortcut that has been defined with a particular contact information detail and a communications method. As such, an assigned shortcut may have a contact information detail and a communications method bound to the shortcut, such that a selection of the assigned shortcut (e.g., a tap on a touch screen display in the area of the assigned shortcut) launches a communications session based on the attributes of the shortcut.

An unassigned shortcut may be generated automatically when a contact information detail is entered into a contact record. For example, when a phone number is entered into a contact record, unassigned shortcuts for "call" and "SMS" may be generated with a contact information attribute of the phone number. When only a single contact information detail is associated with an unassigned shortcut, a communications session may be initiated in response to selection of the unassigned shortcuts. Selection of the unassigned shortcut may include a single tap of a touch screen at the location of the unassigned shortcut on the touch screen.

If multiple contact information details have been entered for a single communications method type (e.g., SMS) then each of the contact information details that could be used (e.g., each of the phone numbers) may be displayed for selection by the user, when the associated unassigned shortcut is selected. Selection of the displayed contact information details may initiate a communications session with respect to the selected contact information detail. Additionally, in accordance with some example embodiments, an option to generate an assigned shortcut with respect to one of the contact information details may be presented for selection to facilitate creation of an assigned shortcut.

According to some example embodiments, contact information details that have been associated with an assigned shortcut may be disassociated from unassigned shortcuts having the same communications method when the assigned shortcut is generated. For example, if two phone numbers are entered, an unassigned shortcut may be automatically generated for a phone call communication method that is associated with both of the phone numbers. If an assigned phone call communications method shortcut is then generated for the first phone number, the first phone number may be disassociated from the unassigned shortcut.

Additionally, assigned shortcuts may be generated by interfacing with contact information details presented on a display. In this regard, if a contact information detail is selected (e.g., via a tap), a window may be presented that presents the associated communications methods that may be used to generate and define an assigned shortcut for the contact information detail. In this regard, according to various example embodiments, communications methods may be presented only if an assigned shortcut for the selected contact information detail and communication method have not be already defined.

Unassigning an assigned shortcut may involve entering a contact record detail dialog and removing the assigned shortcut. The contact information detail may revert back to an unassigned shortcut for the respective communications method. Alternatively, a contextual menu may be implemented to unassign an assigned shortcut. The contextual menu or the unassignment operation may be accessed by receiving a long press touch event on a touch screen display in the area of the shortcut.

Figure 2A:
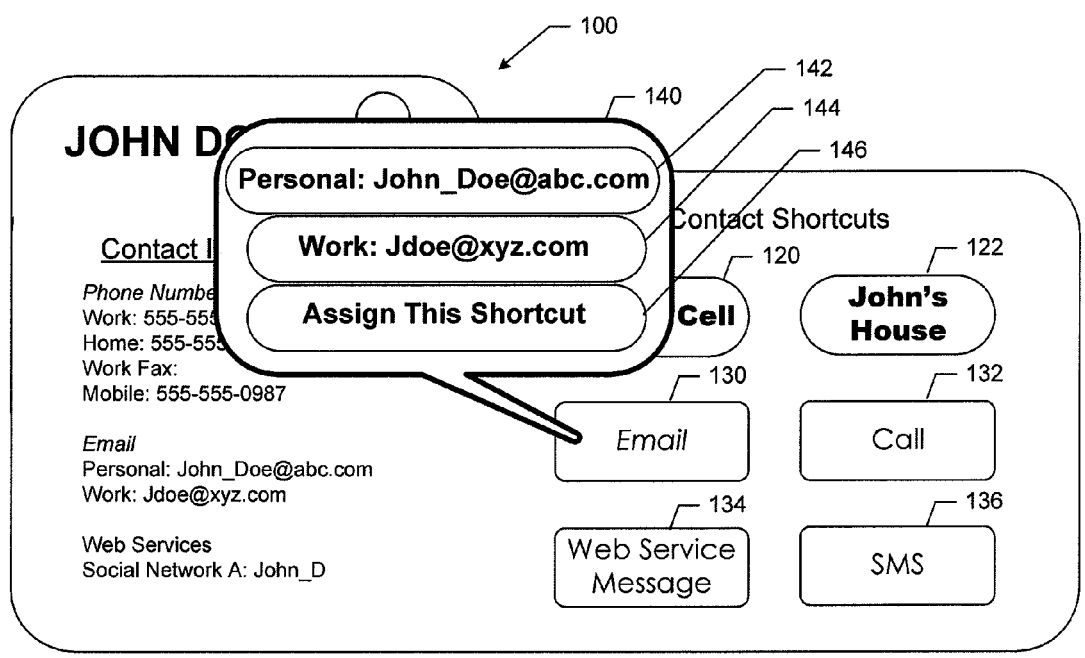
FIG. 2A illustrates a user interface including a contact card and a selection window for an unassigned shortcut according to an example embodiment of the present invention.
Figure 2B:
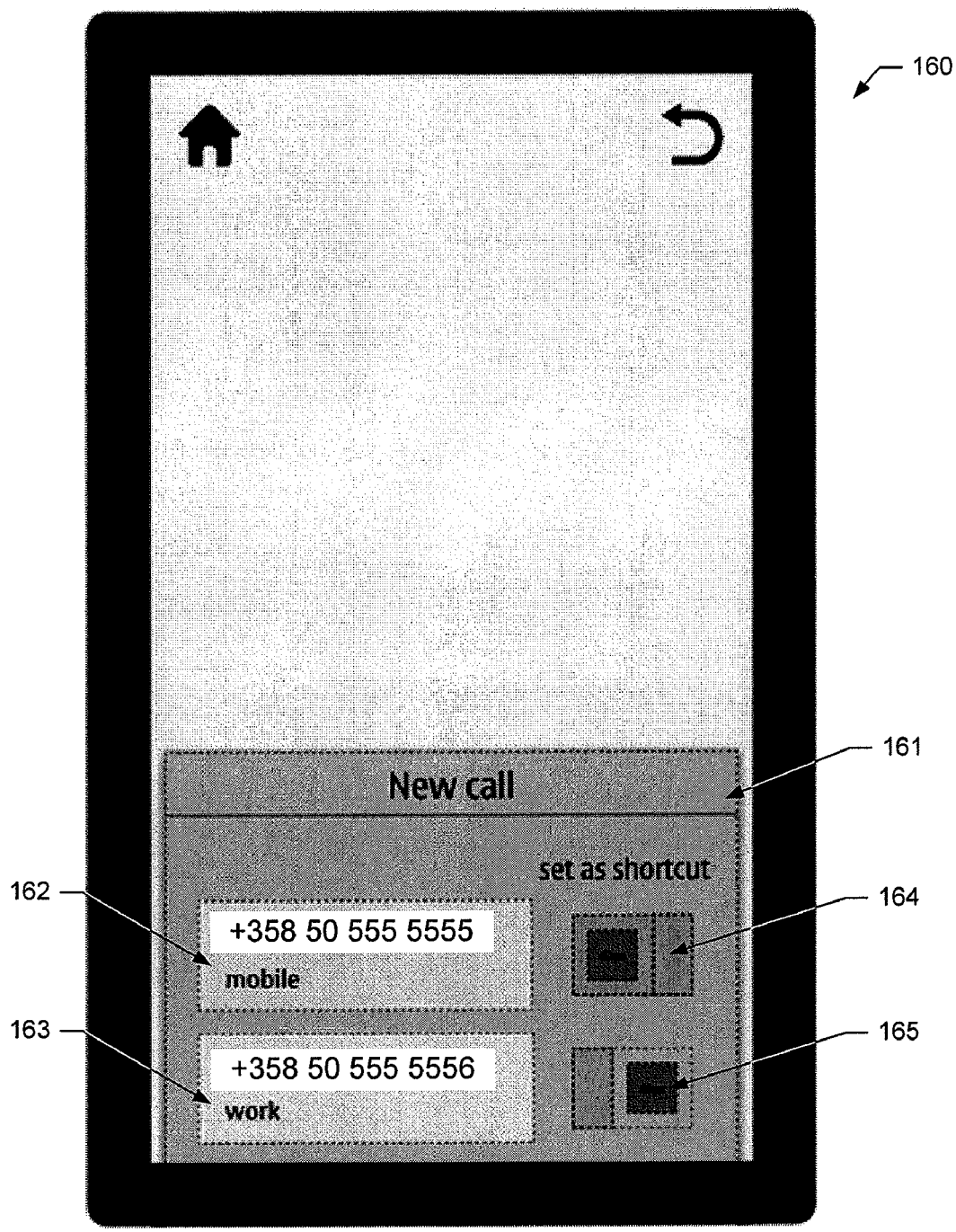
FIG. 2B illustrates another user interface for selecting an unassigned shortcut according to an example embodiment of the present invention.
Figure 3A:
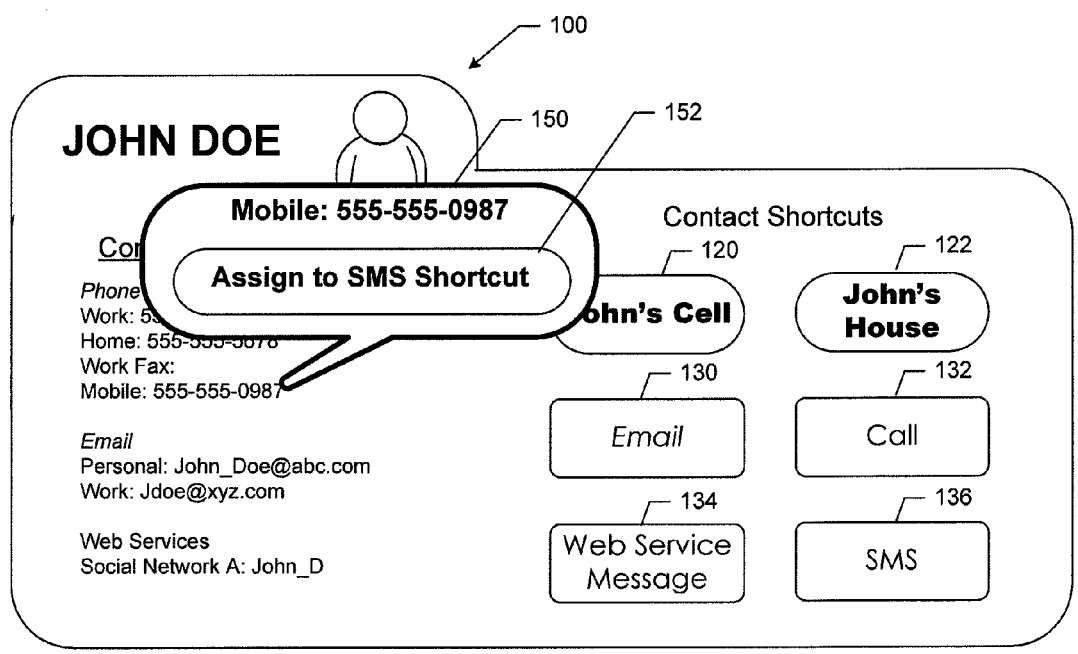
FIG. 3A illustrates a user interface including a contact card and a selection window for a contact information detail according to an example embodiment of the present invention.
Figure 3B:
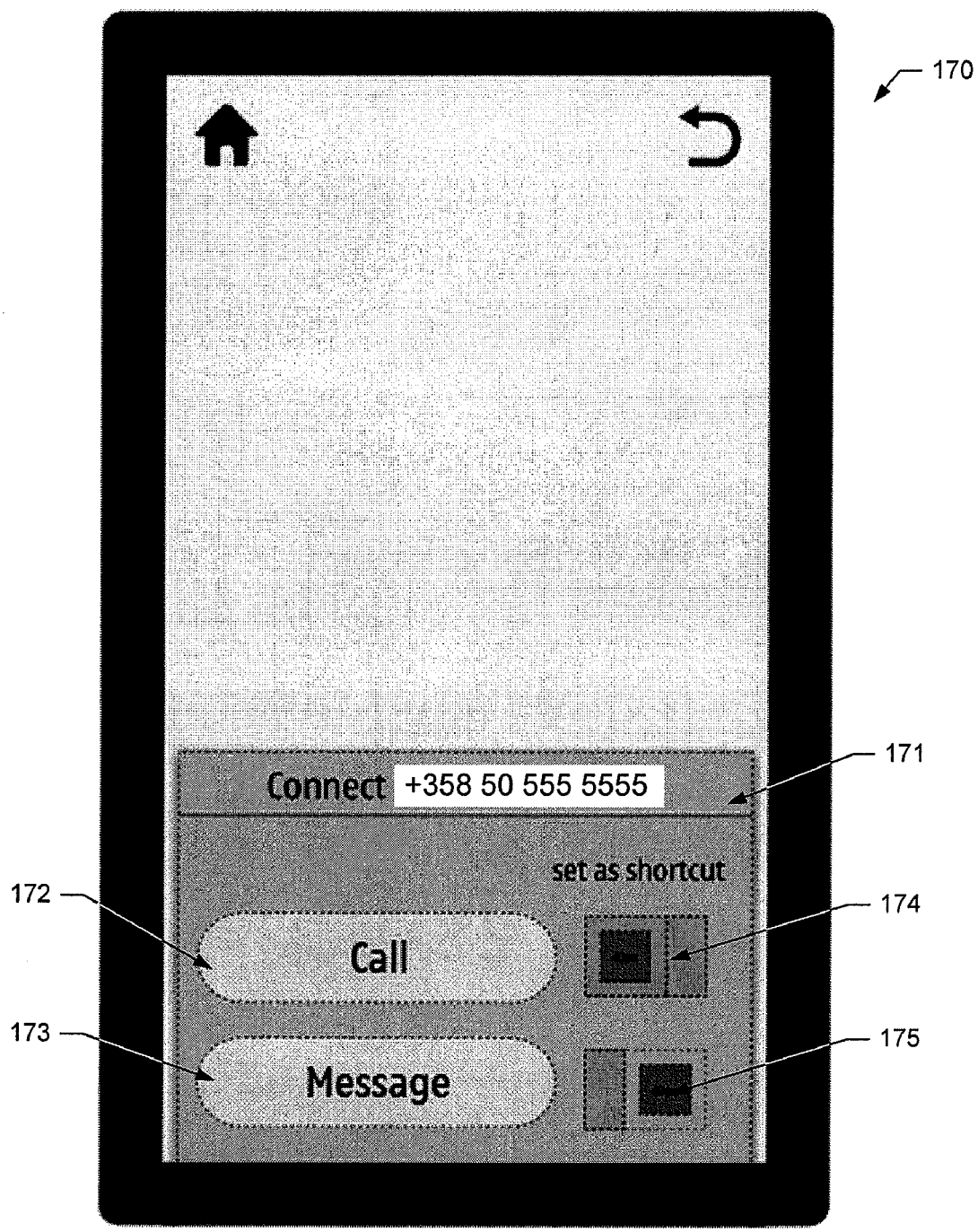
FIG. 3B illustrates another user interface for selecting a contact information detail according to an example embodiment of the present invention.

FIGS. 1-3 will now be described which depict an example presentation of a contact record including shortcuts in accordance with example embodiments of the present invention. Referring now to FIG. 1, a contact card 100, which is a type of contact record, is depicted. The contact card 100 may be presented in response to launching a contact management application on a device, such as a cellular phone. The contact card 100 may include a contact information details section 110 and a contact shortcuts section 111. Within the contact information details section 110, contact information details may be presented and modified. Within the contact shortcuts section 111 any number of assigned and unassigned shortcuts may be presented.

The contact card 100 includes two assigned shortcuts 120 and 122. Assigned shortcuts 120 and 122 may be defined with a phone call communications method and a contact information detail of a phone number. As depicted in FIG. 1, the assigned shortcuts may also include user defined label's that may be modified to provide information to the user. The contact card 100 may also include unassigned shortcuts 130, 132, 134, and 136. The unassigned shortcuts may have been defined based on the contact information details entered in the contact information details section 110. For example, the unassigned email shortcut 130 may have been automatically defined with both of the email addresses included in the contact information details section 110. The unassigned call shortcut 132 may have been automatically defined with the work phone number included in the contact information details section 110, since the home phone number and mobile phone number are already associated with an assigned shortcut. The SMS shortcut 136 may be have been automatically defined with all of the phone numbers included in the contact information details section 110, since no assigned SMS shortcut has been created. The unassigned web service message shortcut 134 may have been automatically defined with the social network screen name included in the contact information details section 110. In this regard, a web service may be a social networking website, a instant messaging service, a web video service, or the like.

FIG. 2A illustrates an example scenario where the unassigned email shortcut 130 has been selected. In response to the selection, a selection window 140 is opened that includes email address selection areas 142 and 144. Selection of either of selection areas 142 or 144 may cause the initiation of a communications session. The selection window 140 also includes a selection area 146 for assigning the shortcut 130. Via selection area 146, a user may assign the shortcut 130 to one of the two email addresses. Upon converting shortcut 130 into an assigned shortcut, subsequent selections of email shortcut 130 may initiate an email communications session by opening an email entry field.

FIG. 2B illustrates another example scenario where the unassigned call shortcut has been selected. In response to the selection, rather than a dialog window appearing, a selection screen 161 is displayed on the display of a mobile device 160 that includes selection areas 162 and 163. Selection of either of selection areas 162 or 163 may cause the initiation of a communications session via the respective phone numbers. The selection screen 161 also includes selection areas 164 and 165 for assigning the associated shortcut. Via selection area 164, a user may assign the shortcut to the mobile phone number. Via selection area 165, a user may assign the shortcut to the work phone number. Upon converting the associated shortcut into an assigned shortcut, subsequent selections of the shortcut may initiate an phone call communications session by transmitting the associated phone number to initiate the call.

FIG. 3A illustrates another example scenario where the mobile phone number contact information detail has been selected. In response to the selection, a selection window 150 is opened with a selection area 152 for assigning an SMS shortcut to the mobile phone number. It is noteworthy that an option for assigning the mobile phone number to a call shortcut is not included because an assigned call shortcut for the mobile phone number already exists.

FIG. 3A illustrates yet another example scenario where the mobile phone number contact information detail has been selected. In response to the selection, a selection screen 171 is displayed on the display of a mobile device 170 with selection area 174 and 175 for assigning the mobile phone number to a call shortcut or an SMS shortcut, respectively. Selection areas 172 and 173 may be selected to initiate a communications session using the mobile phone number as a phone call or an SMS message, respectively.

Figure 4:
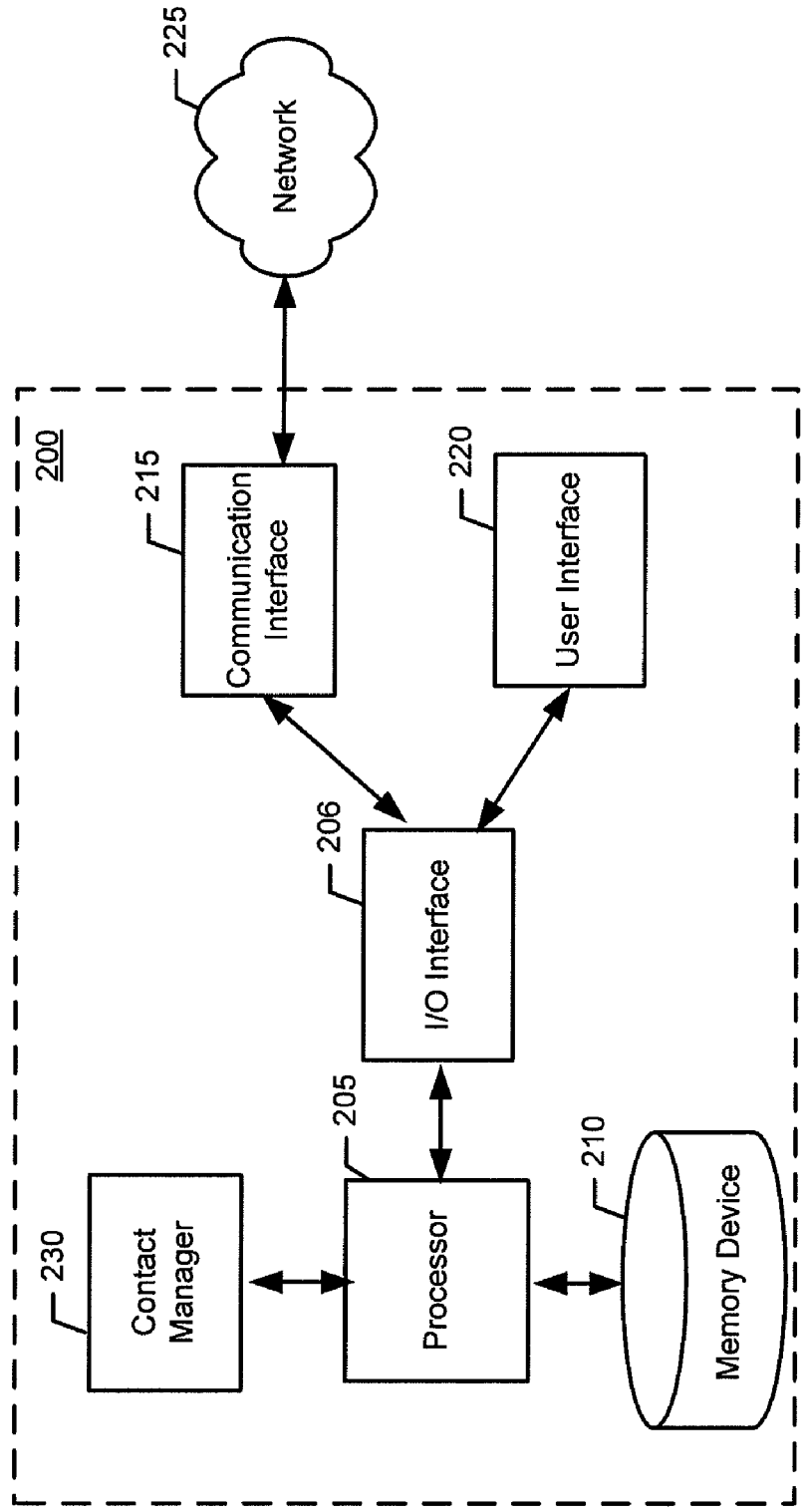
FIG. 4 illustrates a block diagram of an apparatus and associated system for generating and utilizing communications shortcuts according to an example embodiment of the present invention.
Figure 5:
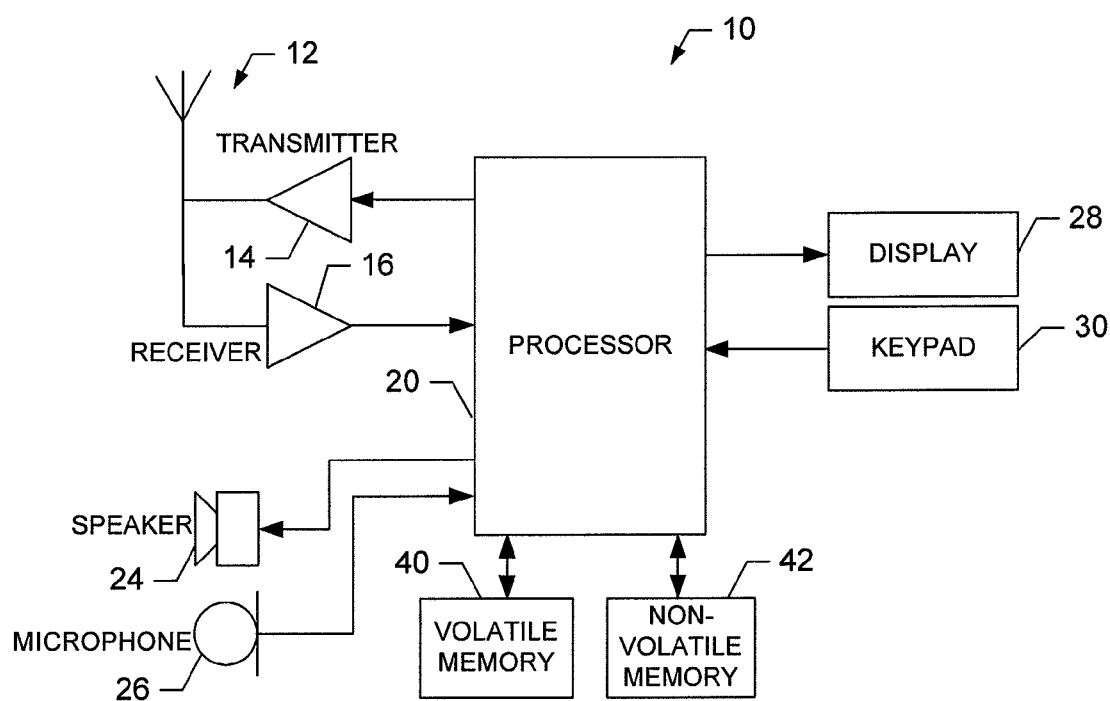
FIG. 5 illustrates a block diagram of a mobile terminal configured to generate and utilize communications shortcuts according to an example embodiment of the present invention.

The description provided above and generally herein illustrates example methods, example apparatuses, and example computer program products for generating and utilizing communications shortcuts. FIG. 4 depicts an example apparatus that is configured to perform various functionalities as described with respect to FIGS. 1-3, and as generally described herein. FIG. 5 depicts another example apparatus in the form of a specific mobile terminal that may be configured to operate as described with respect to FIGS. 1-3, and as generally described herein. The example apparatuses depicted in FIGS. 4 and 5 may also be configured to perform example methods of the present invention, such as the example methods described with respect to FIG. 6.

Referring now to FIG. 4, in some example embodiments, the apparatus 200 may, be embodied as, or included as a component of, a communications device with wired or wireless communications capabilities. In some example embodiments, the apparatus 200 may be part of a communications device, such as a stationary or a mobile terminal. As a mobile terminal, the apparatus 200 may be a mobile computer, mobile telephone, a portable digital assistant (PDA), a pager, a mobile television, a gaming device, a camera, a video recorder, an audio/video player, a radio, and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 215, user interface 220, and a contact manager 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms, methods, and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 215 and the user interface 220. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network 225 and/or any other device or module in communication with the example apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols, IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 220 may be in communication with the processor 205 to receive user input via the user interface 220 and/or to present output to a user as, for example, audible, visual, mechanical or other output indications. The user interface 220 may include, for example, a keyboard, a mouse, a joystick, a display (e.g., a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The contact manager 230 of example apparatus 200 may be any means or device embodied, partially or wholly, in hardware, a computer program product, or a combination of hardware and a computer program product, such as processor 205 implementing stored instructions to configure the example apparatus 200, memory device 210 storing executable program code instructions configured to carry out the functions described herein, or a hardware configured processor 205 that is configured to carry out the functions of the contact manager 230 as described herein. In an example embodiment, the processor 205 includes, or controls, the contact manager 230. The contact manager 230 may be, partially or wholly, embodied as processors similar to, but separate from processor 205. In this regard, the contact manager 230 may be in communication with the processor 205. In various example embodiments, the contact manager 230 may, partially or wholly, reside on differing apparatuses such that some or all of the functionality of the contact manager 230 may be performed by a first apparatus, and the remainder of the functionality of the contact manager 230 may be performed by one or more other apparatuses.

The apparatus 200 and the processor 205 may be configured to perform the following functionality via the contact manager 230. In this regard, the contact manager 230 may be configured to cause the processor 205 and/or the apparatus 200 to perform various functionalities, such as those depicted in the flowchart of FIG. 6 and as generally described herein. For example, the contact manager 230 may be configured to receive a contact information detail at 400. The contact information detail may be associated with at least one communication method. The contact manager 203 may also be configured to associate, at 410, a contact information detail to an unassigned shortcut for implementing a communications method associated with the contact information detail. In some example embodiments, associating the contact information detail to the unassigned shortcut may include determining that an unassigned shortcut for a communications method has not been generated, and generating the unassigned shortcut for implementing the communications method. In some example embodiments, the unassigned shortcut may be associated with multiple contact information details associated with the communication method. Further, in some example embodiments, the contact manager 230 may configure an unassigned shortcut to provide selectable options for initiating a communications session via the contact information details associated with the unassigned shortcut.

The contact manager 230 may also configure the unassigned shortcut, at 420, to initiate a communication session with a party (e.g., individual, business, etc.) associated with the contact information detail in response to a selection of the unassigned shortcut. According to some example embodiments, the contact manager 230 may be configured to assign, in response to user input, the contact information detail to be a sole contact information detail for the shortcut, thereby converting the unassigned shortcut into an assigned shortcut at 430. According to some example embodiments, the assigned shortcut may be configured to initiate the communication session with the party in response to a single tap event of a displayed representation of the assigned shortcut.

Referring now to FIG. 5, a more specific example apparatus in accordance with various embodiments of the present invention is provided. The example apparatus of FIG. 5 is a mobile terminal 10 configured to communicate within a wireless network, such as a cellular communications network. The mobile terminal 10 may be configured to perform the functionality of the mobile terminal 101 and/or apparatus 200 as described herein. More specifically, the mobile terminal 10 may be caused to perform the functionality of the contact manager 230 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, the display 28 (which may be a touch screen display), and the keypad 30 may be included as parts of a user interface.

Figure 6:
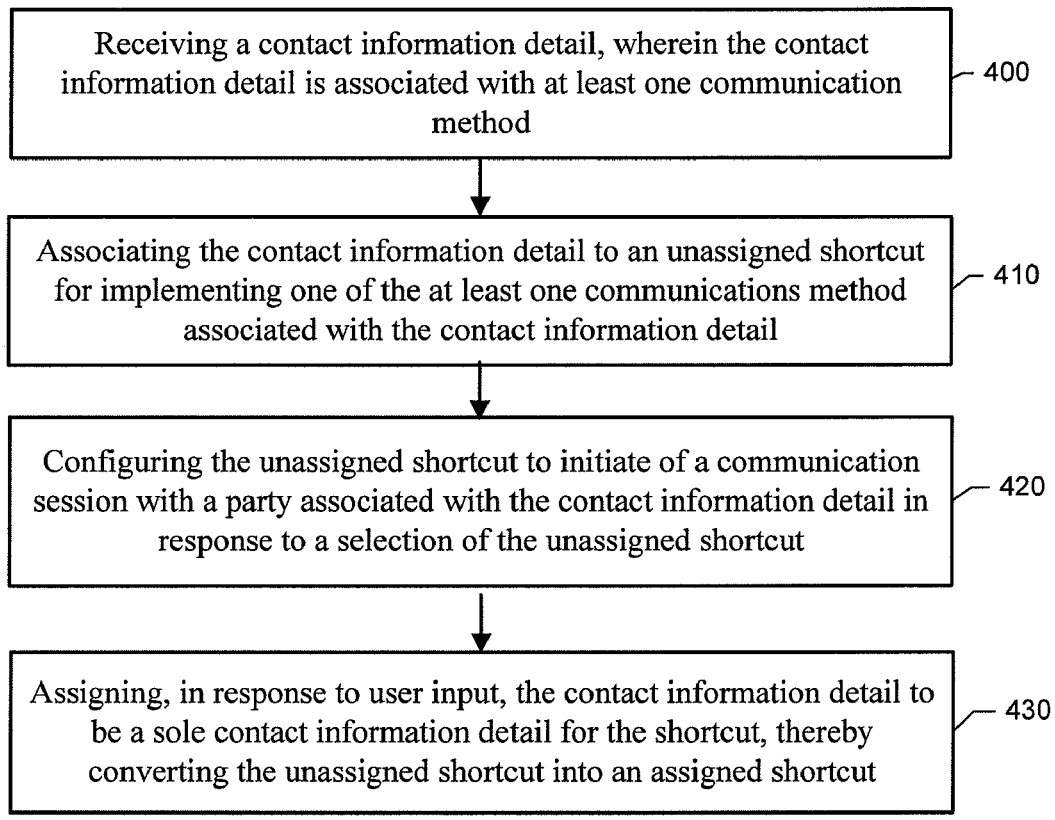
FIG. 6 illustrates a flow chart of a method for generating and utilizing communications shortcuts according to an example embodiment of the present invention.

FIG. 6 illustrates flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    associating, via a processor, at least one contact information detail and a communication method to an unassigned shortcut in response to selection of the unassigned shortcut, in an instance where one contact information detail is associated with the unassigned shortcut, initiating a communication session using the communication method with a party associated with the one contact information detail; and
    in response to selection of the unassigned shortcut, in an instance where more than one contact information detail is associated with the unassigned shortcut, causing display of selections associated with the more than one contact information details, and in response to selection of a contact information detail, initiating a communication session using the communication method with a party associated with the selected contact information detail and assigning the selected contact information detail to be a sole contact information detail for the shortcut, thereby converting the unassigned shortcut into an assigned shortcut and changing the display of the shortcut.

2. The method of claim 1, wherein associating the at least one contact information detail to the unassigned shortcut comprises:
    determining that an unassigned shortcut for the communication method has not been generated; and
    generating the unassigned shortcut.

3. The method of claim 1
    wherein the assigned shortcut is configured to initiate the communication session with the party in response to a single selection of the assigned shortcut.

4. An apparatus comprising at least one processor and at least one memory including computer program code, the at least one memory and the computer program code configured to, with the at least one processor, cause the apparatus at least to:
    associate at least one contact information detail and a communication method to an unassigned shortcut on a display
        in response to selection of the unassigned shortcut, in an instance where one contact information detail is associated with the unassigned shortcut, initiate a communication session using the communication method with a party associated with the one contact information detail; and
        in response to selection of the unassigned shortcut, in an instance where more than one contact information detail is associated with the unassigned shortcut, cause display of selections associated with the more than one contact information details, and in response to selection of a contact information detail, initiate a communication session using the communication method with a party associated with the selected contact information detail and assign the selected contact information detail to be a sole contact information detail for the shortcut, thereby converting the unassigned shortcut into an assigned shortcut and changing the display of the shortcut.

5. The apparatus of claim 4, wherein the associating comprises:
    determining that an unassigned shortcut for the communication method has not been generated; and
    generating the unassigned shortcut.

6. The apparatus of claim 4, wherein the assigned shortcut is configured to initiate the communication session with the party in response to a single selection of the assigned shortcut.

7. A computer program product comprising a non-transitory computer readable storage medium having computer program code stored thereon, the computer program code being configured to, when executed, cause an apparatus to at least:
    associate at least one contact information detail and a communication method to an unassigned shortcut
        in response to selection of the unassigned shortcut, in an instance where one contact information detail is associated with the unassigned shortcut, initiate a communication session using the communication method with a party associated with the one contact information detail; and
        in response to selection of the unassigned shortcut, in an instance where more than one contact information detail is associated with the unassigned shortcut, cause display of selections associated with the more than one contact information details, and in response to selection of a contact information detail, initiate a communication session using the communication method with a party associated with the selected contact information detail and assign the selected contact information detail to be a sole contact information detail for the shortcut, thereby converting the unassigned shortcut into an assigned shortcut and changing the display of the shortcut.

8. The computer program product claim 7, wherein associating the at least one contact information detail to the unassigned shortcut comprises:
determining that an unassigned shortcut for the communication method has not been generated; and
generating the unassigned shortcut.

9. The computer program product of claim 7, wherein the assigned shortcut is configured to initiate the communication session with the party in response to a single selection of the assigned shortcut.

* * * * *

UNITED STATES PATENT AND TRADEMARK OFFICE
CERTIFICATE OF CORRECTION

PATENT NO. : 8,363,589 B2
APPLICATION NO. : 12/648970
DATED : January 29, 2013
INVENTOR(S) : Haaparanta It is certified that error appears in the above-identified patent and that said Letters Patent is hereby corrected as shown below:

In the Claims:

Column 14, Claim 8,
Line 1, "product claim 7" should read --product of claim 7--.

Signed and Sealed this
Twentieth Day of August, 2013

Teresa Stanek Rea
*Acting Director of the United States Patent and Trademark Office*